US 6,745,031 B2

(12) United States Patent
Chun et al.

(10) Patent No.: US 6,745,031 B2
(45) Date of Patent: Jun. 1, 2004

(54) RECONNECTION OF DROPPED CALL IN MOBILE COMMUNICATION SYSTEM

(75) Inventors: Kyung-Joon Chun, Seoul (KR); Scok-Jin Ham, Seoul (KR)

(73) Assignee: Samsung Electronics Co., Ltd. (KR)

( * ) Notice: Subject to any disclaimer, the term of this patent is extended or adjusted under 35 U.S.C. 154(b) by 91 days.

(21) Appl. No.: 09/999,836

(22) Filed: Oct. 24, 2001

(65) Prior Publication Data
US 2002/0068586 A1 Jun. 6, 2002

Related U.S. Application Data

(62) Division of application No. 09/294,046, filed on Apr. 19, 1999.

(30) Foreign Application Priority Data

Apr. 17, 1998 (KR) ......................... 1998-13789

(51) Int. Cl.⁷ ................................. H04Q 7/20
(52) U.S. Cl. ............... 455/435.1; 455/422.1; 455/450
(58) Field of Search ............... 455/422.1, 450, 455/452.1, 509, 67.11, 435.1, 433, 456.1

(56) References Cited

U.S. PATENT DOCUMENTS

| 5,239,571 | A | 8/1993 | Takahashi |
| 5,546,382 | A | 8/1996 | Fujino |
| 5,566,236 | A | 10/1996 | MeLampy et al. |
| 5,995,830 | A | 11/1999 | Amin et al. |
| 6,032,040 | A | 2/2000 | Choy et al. ............. 455/414 |
| 6,061,559 | A | 5/2000 | Eriksson et al. |
| 6,249,681 | B1 | 6/2001 | Virtanen ............. 455/466 |

FOREIGN PATENT DOCUMENTS

| JP | 05276262 A | 10/1993 |
| JP | 07-177576 | 7/1995 |
| JP | 07-264669 | 10/1995 |

Primary Examiner—Quochien B. Vuong
(74) Attorney, Agent, or Firm—Dilworth & Barrese LLP

(57) ABSTRACT

There is provided a method of reconnecting a communication link terminated by a service impediment during a service between a mobile station (MS) subscriber and the other party communicating with the MS subscriber through a mobile communication system having a plurality of mobile switching centers (MSCs) connected to one another, each MSC being connected to a plurality of base stations (BSs). When the service impediment lasts for at least a predetermined first time period, the MS subscriber sends a reconnection request signal. Then, the service is reinitiated between the MS subscriber and the other party through one of the plurality of BSs and one of MSCs connected to the BS in response to the reconnection request signal.

10 Claims, 12 Drawing Sheets

| FIELD | LENGTH (BIT) |
|---|---|
| RELEASE_STAT | 1 |

(0=NORMAL, 1=DROP)

FIG. 2

| FIELD | LENGTH (BIT) |
|---|---|
| OLD_BS_ID | 16 |

FIG. 3

| FIELD | LENGTH (BIT) |
|---|---|
| DCAR_FLAG | 1 |

(0=DACT, 1=ACT)

FIG. 4

| FIELD | LENGTH (BIT) |
|---|---|
| WAITING_FLAG | 1 |

(0=NORMAL, 1=DROP)

FIG. 5

RECONNECTION OF DROPPED CALL IN MOBILE COMMUNICATION SYSTEM

This is a divisional of copending application Ser. No. 09/294,046 filed Apr. 19, 1999, which is incorporated herein by reference.

CLAIM OF PRIORITY

This application makes reference to, incorporates the same herein, and claims all benefits accruing under 35 U.S.C. §119 from an application entitled RECONNECTION OF DROPPED CALL IN MOBILE COMMUNICATION SYSTEM earlier filed in the Korean Industrial Property Office on Apr. 17, 1998, and there duly assigned Serial No. 98-13789.

BACKGROUND OF THE INVENTION

1. Field of the Invention

The present invention relates generally to the field of wireless communication, and more particularly, to a method of reconnecting a dropped call in a mobile communication system.

2. Description of the Related Art

In a public land mobile network (PLMN), a connection is made between a base station (BS) and a mobile station (MS) in a radio environment. In some cases, call service cannot be provided in shadow areas due to physical characteristics of the radio environment which adversely affect signal propagation. In the case where a terminal subscriber roams on foot or is moving in a vehicle, a call can be temporarily dropped. In accordance with conventional technology, if a call drop lasts for a predetermined time period, it is determined that a call service cannot be provided and the call is released. In IS-95, the predetermined time is approximately 5 seconds (i.e., equal to one frame duration 20 ms×270). Upon this unintended call release, a calling party should resume the attempt to call to a called party.

To overcome the aforestated problem of call drops, several approaches have been suggested in the prior art, including:

(1) U.S. Pat. No. 5,546,382: reconnection of a circuit to continuously provide a data communication service upon generation of a transmission failure;

(2) U.S. Pat. No. 5,239,571: reconnection of an abnormally terminated communication line by adding a separate device to a terminal or modifying the terminal. That is, with the aid of a RAM in the terminal for storing information on call origination and call termination, a call is automatically set up in the case of an abnormal disconnection of a call; and (3) U.S. Pat. No. 5,566,236: reconnection of a disconnected telephone communication by use of a nearby telecommunication system (e.g., PBX: Private Branch Exchange and Centrex: Centralized PBX Service) with the concept of an intelligent network introduced.

SUMMARY OF THE INVENTION

Accordingly, an object of the present invention is to provide a method of automatically reconnecting a dropped call which is while a call service is being provided in a mobile communication system.

Another object of the present invention is to provide a method of automatically reconnecting a dropped call while a call service is being provided in a mobile communication system.

A further object of the present invention to provide a method of manually reconnecting a dropped call which is while a call service is being provided in a mobile communication system.

It is a further object of the present invention to provide a method of reconnecting a dropped call upon detection of the call drop by a mobile station.

Another object of the present invention is to provide a method of reconnecting a dropped call upon detection of the call drop by a system (i.e., base station (BS) or mobile switching center (MSC)).

Another object of the present invention is to provide a method of reconnecting a call dropped due to an abnormality of bidirectional traffic channels for communication between a mobile station (MS) and a system, upon detection of the call drop by both the MS and the system.

A still further object of the present invention is to provide a method of reconnecting a dropped call when a mobile station (MS) detects the call drop and requests a location registration.

Briefly stated, these and other objects are accomplished by a method of reconnecting a communication link terminated by a service impediment during a service between an MS subscriber and a counterpart subscriber communicating with the MS subscriber through a mobile communication system having a plurality of MSCs connected to one another, each MSC being further connected to a plurality of base stations BSs. When the service impediment lasts for at least a predetermined first time period, the MS subscriber sends a reconnection request signal. Then, the service is reinitiated between the MS subscriber and its counterpart subscriber through one of the plurality of BSs and one of MSCs connected to the BS in response to the reconnection request signal.

BRIEF DESCRIPTION OF THE DRAWINGS

The above objects and advantages of the present invention will become more apparent by describing in detail preferred embodiments thereof with reference to the attached drawings in which:

FIG. 2 illustrates a field of a call release signal, indicating whether the call release signal is generated in a normal state or due to a dropped call;

FIG. 3 illustrates a parameter of a reconnection request signal to be used for a connection to an established call on a temporary hold state;

FIG. 4 illustrates a parameter indicating whether a dropped call reconnection function is individually registered as an additional service for each MS;

FIG. 5 illustrates a parameter discriminating a normal call release signal from a dropped call-caused call release signal;

DETAILED DESCRIPTION OF THE PREFERRED EMBODIMENTS

Figure 1:
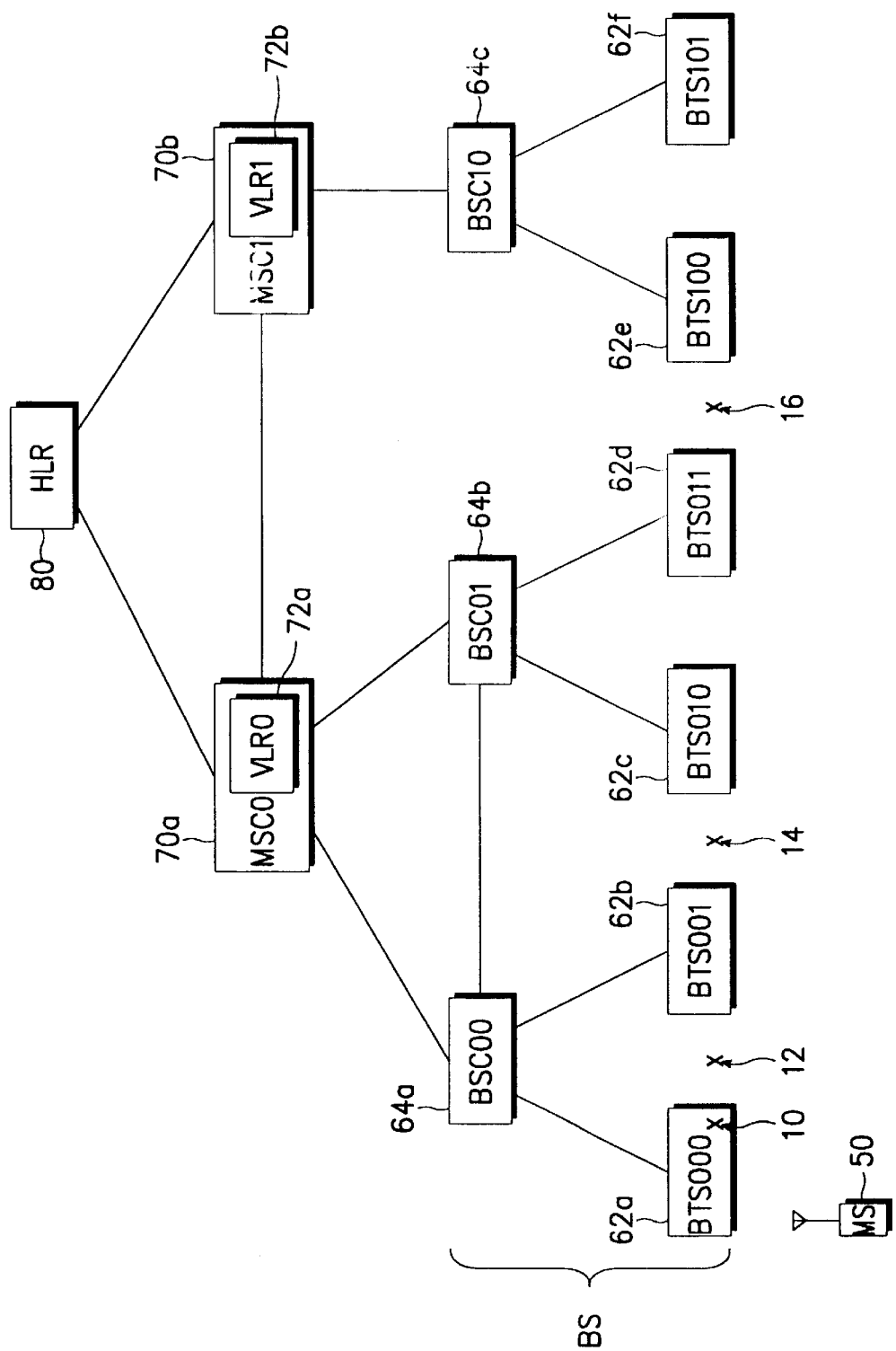
FIG. 1 is a block diagram of a mobile communication system according to the present invention.

Preferred embodiments of the present invention will be described in detail with reference to the attached drawings. Like reference numerals denote the same components in the drawings. It is to be noted that a detailed description of the known structure and function of the present invention will be omitted if it is deemed to obscure the subject matter of the present invention.

Terms and Definitions a call service in progress: a state where voice communication and data communication of still images, moving pictures, and the like are being performed.

dropped call: is defined as a call provided in a call service which can no longer be maintained either temporarily or permanently. A dropped call may be caused by either a call disconnection, noise channel on a specific channel, or non-serviceability.

call disconnection: is the state where a call remains disconnected for a predetermined time.

The embodiments of the present invention will be described within the context of the North American digital mobile communication system standard (IS-95, IS-634, and IS-41 series) by way of example. The present invention is also applicable to 3G IS-95 which provides the additional services of high quality voice, high speed data, moving pictures, and Internet browsing.

Referring to FIG. 1, the mobile communication system to which the present invention is applied includes an HLR (Home Location Register) 80, MSCs (Mobile Switching Centers) MSC0 70a and MSC1 70b, BSCs (Base Station Controllers) BSC00 64a, BSC01 64b, and BSC10 64c, BTSs (Base Station Transceiver Subsystems) BST000 62a to BTS101 62f, and an MS 50. A plurality of HLRs and MSCs are interconnnected in the PLMN to perform subscriber management and call switching. As shown in FIG. 1, the single HLR 80 is connected to a plurality of MSCs, MSC0 70a and MSC1 70b. Each MSC is in turn connected to a plurality of BSCs, and each BSC to a plurality of BTSs. A BS is typically comprised of a BSC and BTSs.

An MSC controls a connection to the PSTN (Public Switch Telephone Network) and the PLMN (public land mobile network). A BSC controls a radio link and performs a handoff, a BTS forms a radio link with an MS and manages radio resources, and an HLR registers subscriber locations and serves as a database for storing subscriber information. Each MSC has a VLR (Visitor Location Register) for temporarily storing the information of an MS entering the service area of the MSC. If the MS moves into another service area, the stored information is discarded.

For a call set-up, the mobile communication system assigns radio channels between an MS and a BTS, forms communication links between the BTS and a BSC, between the BSC and an MSC, and between the MSC and the PLMN or an external network such as PSTN. If the established call cannot be maintained for a predetermined time because the MS is in a shadow area or due to characteristics of the radio environment, the mobile communication system typically disconnects the call. Shadow area problems may arise from a number of situations including, for example, an elevator, a relay-free tunnel, a long tunnel located between adjacent cells, a shadow area among dense tall buildings.

A call drop as defined in the embodiments of the present invention can occur in such locations as indicated by reference numerals 10, 12, 14, and 16 in FIG. 1.

Reference numerals 10, 12, and 14 indicate locations of a dropped call within the same MSC area, and reference numeral 16 indicates a location of a dropped call between BTSs covered by different MSCs. Specifically, reference numeral 10 denotes a call dropped location of the MS 50 communicating with the BTS000 62a within the coverage area of the BTS000 62a, reference numeral 12 denotes a call dropped location of the MS 50 communicating with the BTS000 62a or the BTS001 62b in the service area of the BSC00 64a, and reference numeral 14 denotes a call dropped location of the MS 50 communicating with the BTS001 62b or the BTS010 62c on the border of their coverage areas.

A BS and an MSC of FIG. 1 controls the reconnection of a dropped call, possibly using the same algorithm.

A dropped call reconnecting function can be provided in two ways: (a) a system applies the function indiscriminately to all MSs by modifying their operations; and (b) the function is provided on an individual basis to each MS as an additional service. The former method is viable if all the subscriber terminals are similarly configured to implement the dropped call reconnecting function. The latter method allows a flexible application of the reconnection function, and only subscribers requiring the service need modify their terminals.

In the embodiments of the present invention, either existing signals are modified or new signals are used. Existing call release signals including a "Release signal" communicated between a BS and an MSC and a "Release Order signal" which is communicated between an MS and a BS, can be used or added with a new function. If a call drop can be detected from the call release signals, they can be used. Otherwise, a parameter as shown in FIG. 2 is added to them to separately indicate a normal call release signal or a dropped call-caused call release signal.

In FIG. 2, a parameter RELEASE_STAT, indicating release status is added to a call release signal for discriminating normal call release signal from a call release signal due to a dropped call. The parameter occupies one bit. If the bit is zero, it indicates a normal call release signal. If the bit is one, it indicates a call release signal due to a dropped call.

Figure 6:
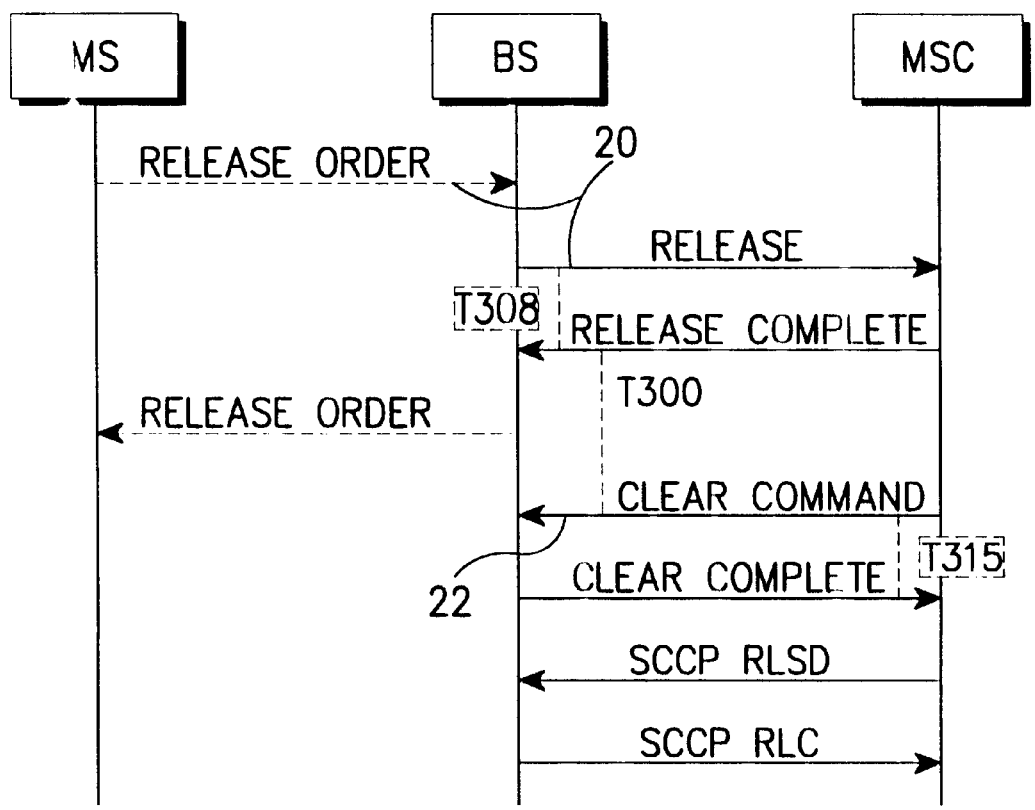
FIG. 6 is a flowchart illustrating a method for releasing an MS originated call based on IS-634 standards.

A typical protocol for using the existing signals "Release" and "Release Order" is shown, by way of example, in FIG. 6 which illustrates the signal flow for releasing an MS originated call based on the IS-634 standard. Reference numeral 20 denotes the signals "Release" and "Release Order". Alternatively, the parameter RELEASE_STAT can be added to a signal "Clear" to achieve the same objective. As an additional alternative solution, a new signal can be used.

To obtain information to be used for a connection to an established call on a temporary hold, a conventional reconnection request signal "Reconnection" directed from an MS to a BS, from a BS to an MSC, from an MSC to a VLR, and from an MSC to another MSC can be used or modified. When directed from an MS to a BS or from a BS to an MSC, messages used for an orgination call use an additional parameter, OLD_BS_ID, shown in FIG. 3 as information to be used to make a connection to an established call on a temporary hold. This parameter includes 16 bits and can be generated by modifying an existing origination message and a set-up signal.

Figure 7:
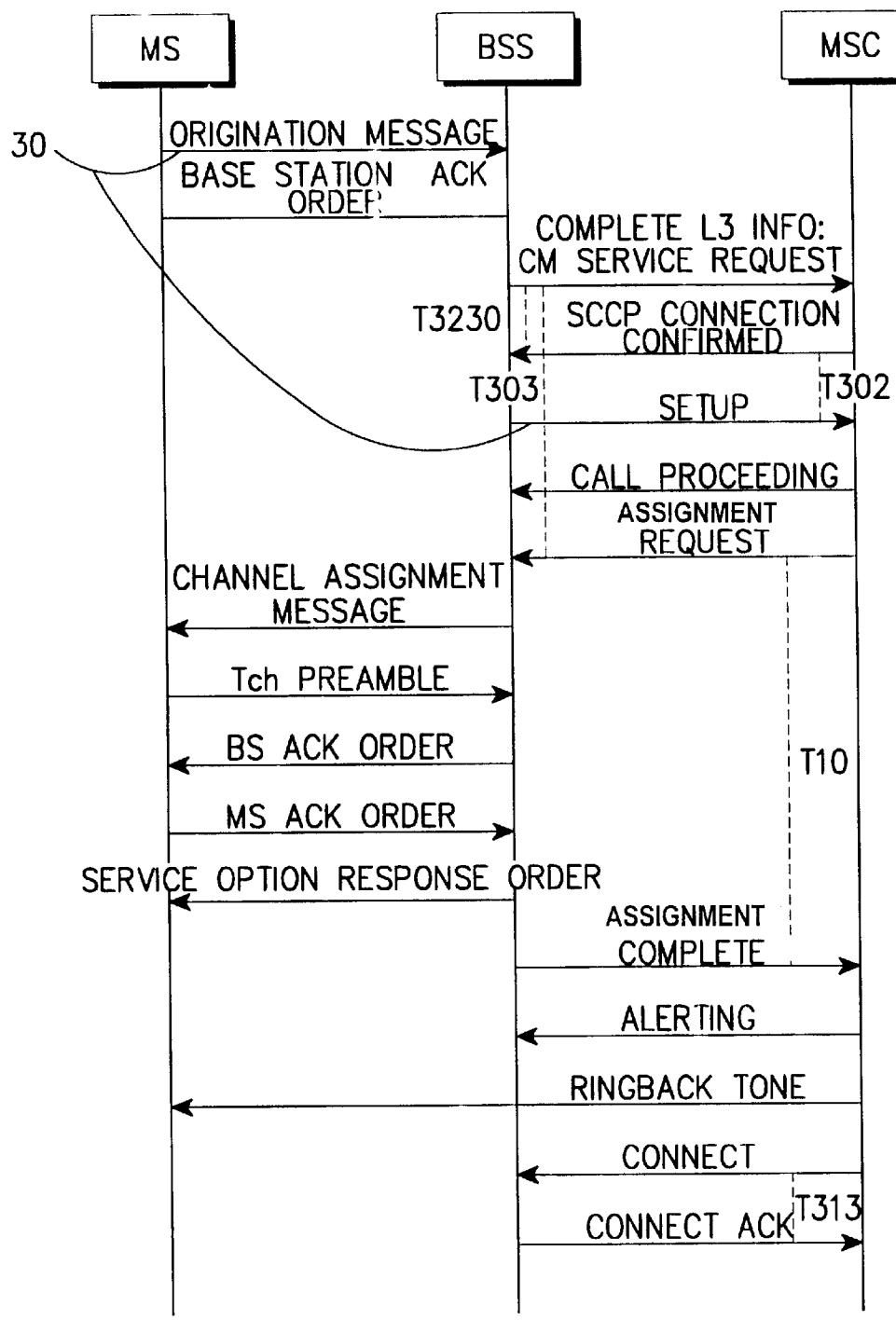
FIG. 7 illustrates an MS originated call process.

FIG. 7 illustrates the procedure for an MS originated call. In FIG. 7, reference numeral 30 denotes signals "Origination Order" and "Setup" added with the parameter OLD_BS_ID.

To indicate whether a dropped call reconnection function is provided as an additional service to each MS. As previously described, a parameter DCAR_FLAG, as shown in FIG. 4 is added to data in the HLR 80, and VLR0 72*a* & VLR1 72*b* of FIG. 1. This parameter is one bit. If the bit is zero, it indicates a deactivation state (0=DACT) and if the bit is one, it indicates an activation state (1=ACT).

A parameter WATING_FLAG, shown in FIG. 5 for discriminating a normal call release signal from a dropped call-caused call release signal is added to the subscriber data in VLR0 72*a* and VLR1 72*b* of FIG. 1. This parameter is one bit. If the bit is zero, it indicates a normal call release state (0=NORMAL), and if the bit is one, it indicates a call drop release state (1=DROP). The initial value of the parameter is zero.

Drop Call Detection

A dropped call is recognized in the following ways according to the embodiments of the present invention:

First Embodiment:

Detection by an MS

Detection of dropped call information by MS: an MS detects the drop of a call in progress due to an abnormality of a traffic channel directed from the system to the MS. For example, the MS would store information on a call drop generating location, and if the MS transits to a normal state, it then notifies the system of the call drop. That is, the MS notifies the BS and MSC.

Second Embodiment:

Detection by a System

Detection of dropped call by system: in this case, the system can determine whether a call in progress drops or not. The call drop is caused by an abnormality of a traffic channel directed from an MS to the system. The system sends a reconnection request for the MS to perform a reconnection function, or forces the reconnection function to be implemented.

Third Embodiment:

Abnormality of bidirectional traffic channels between MS and system.

Fourth Embodiment:

Location Registration Request from MS

After a call is dropped, an MS transits to a normal state without information on a call drop-caused location, reserves information different from existing parameters, and requests a location registration to the system due to the call drop. Upon generation of a call drop in this situation, the MS is normally initialized and registers its location. If the updated value of the parameter WAITING_FLAG in a VLR is one, the previously established call is reconnected. The location registration is the process by which an MS notifies a BTS of its location, status, identification, slot cycle, and other characteristics.

Drop Call Processing

Processing a dropped call varies depending upon how the dropped call is detected. Prior to describing dropped call processing according to the previously described four detection methods, dropped call processing performed by an MS, a BS, and an MSC alone or in combination will be described comprehensively referring to FIGS. 1 and 8.

Figure 8A:
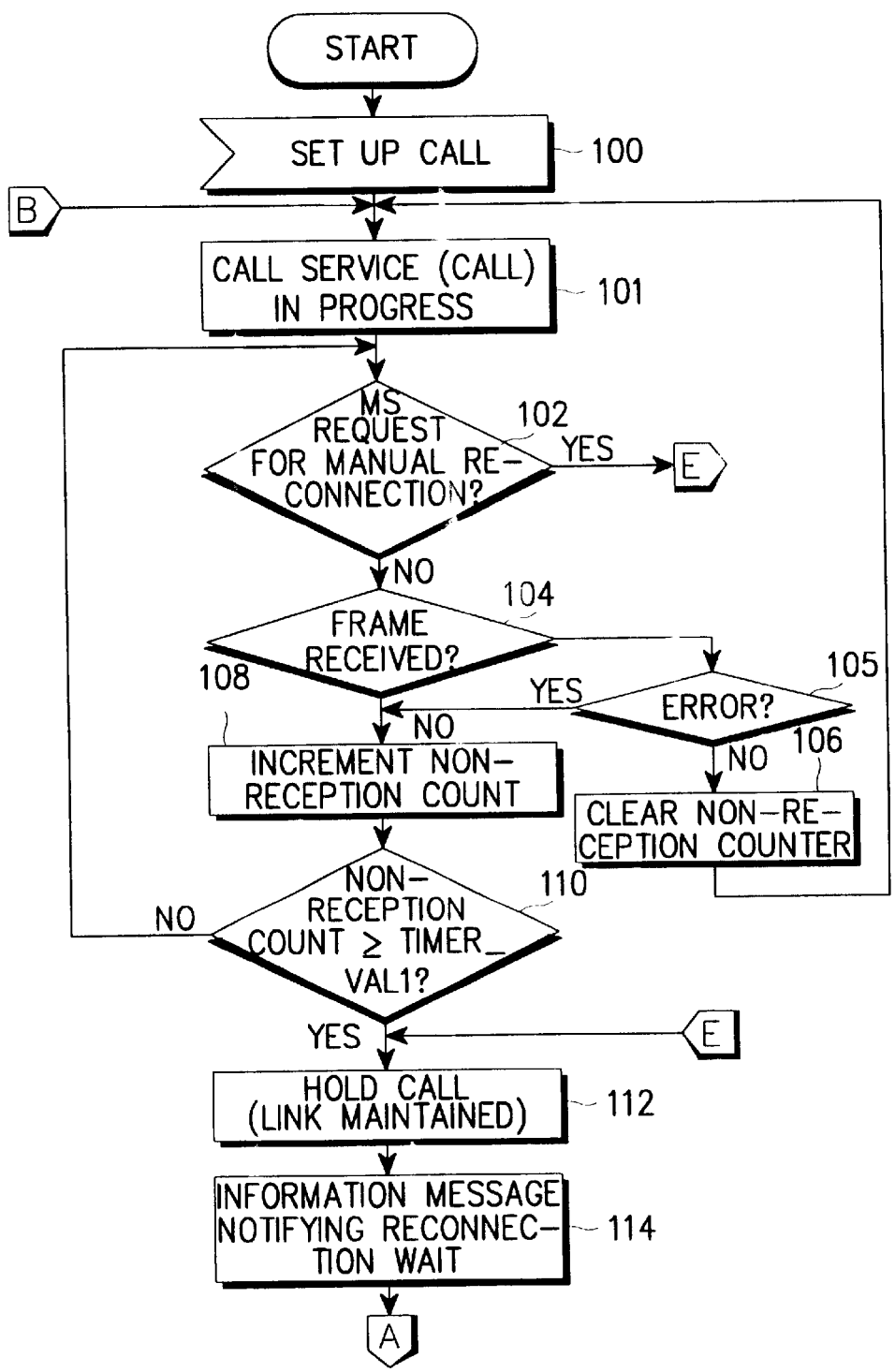
FIG. 8 is a comprehensive flowchart illustrating a method for processing a dropped call in an MS, BS, or MSC according to embodiments of the present invention.
Figure 8B:
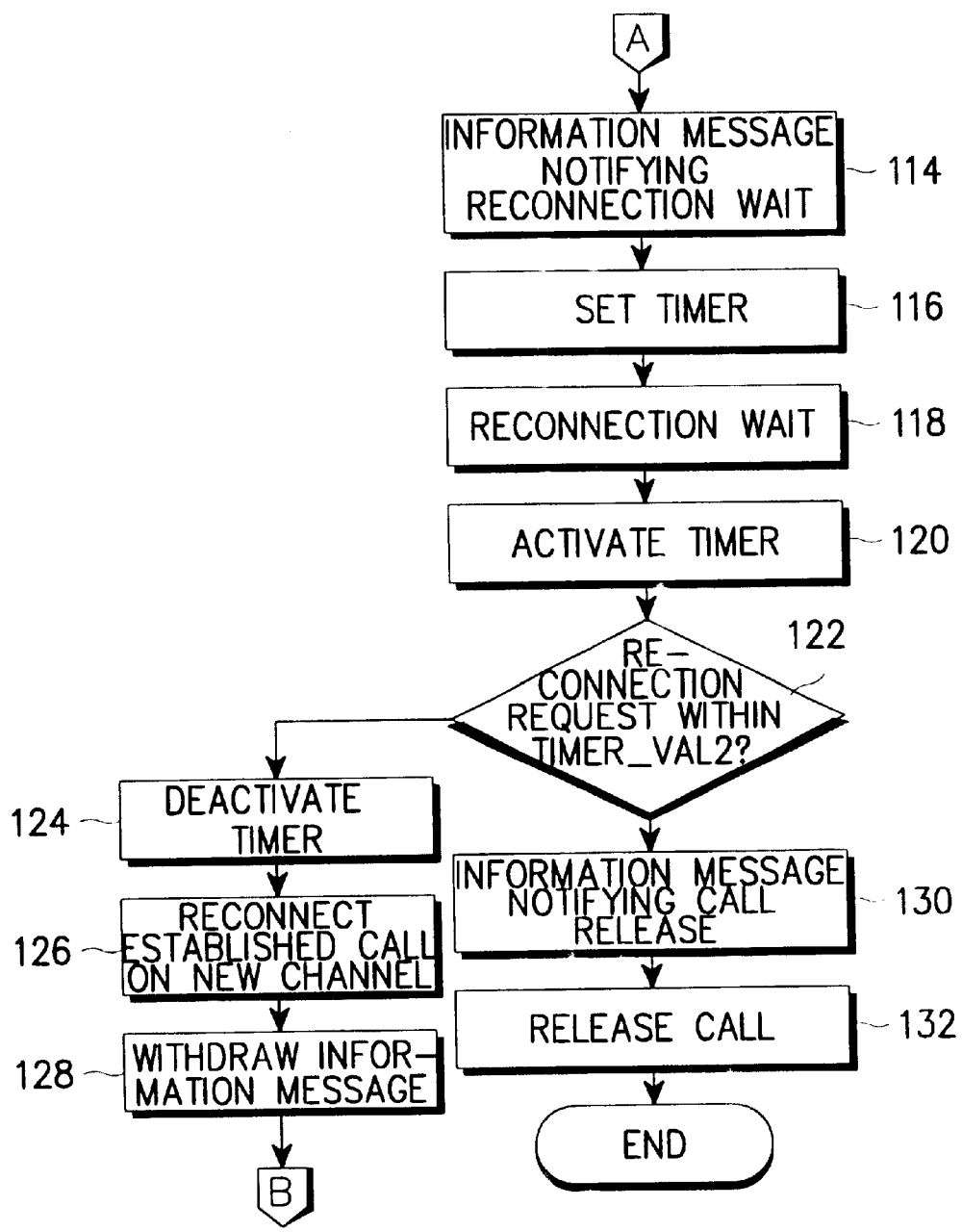

In FIG. 8, a call is set up in step 100 and proceeds in step 101. An MS or a BS determines in step 102 whether there is a manual reconnection request from an MS subscriber during the call. The MS subscriber can manually request a call reconnection by pressing a manual reconnection request key when serious noise is generated in voice or images, or the voice is mute during the call. The manual reconnection request key can be added to a key pad of the terminal, or may be provided using an existing function key, or constructed by a combination of existing digit keys.

In the absence of the manual reconnection request from an MS subscriber, it is determined whether frames are being continuously received on a current traffic channel, in step 104. Upon receipt of a frame, it is determined whether the received frame has an error, in step 105. If no errors exist in the frame, a counter for counting unreceived or bad frames (hereinafter, referred to as a non-reception counter) is cleared in step 106. If the frame has an error in step 105, a non-reception count is incremented in step 108. Then, it is determined whether the non-reception count is equal to or greater than a predetermined time Timer_Val1, in step 110. The predetermined time Timer_Val1 varies depending upon a system operation state and subscriber characteristics, ranging from zero to ten seconds, preferably 1.2 seconds, to determine whether a call is dropped or not. The time of 1.2 seconds is about 5 seconds shorter than the release time for a call in the prior art. The value Timer_Val1 is registered as system initialization data and may be changed by an operator. When the dropped call reconnection function is uniformly registered for all MSs, the value Timer_Val1 is set as a predetermined value commonly applied each MS. On the other hand, if the function is provided individually for each MS, the value Timer_Val1 is unique to each MS.

The ways an MS and a BS detect a call drop will be described in more detail.

BS Detection of a Call Drop

Figure 15:
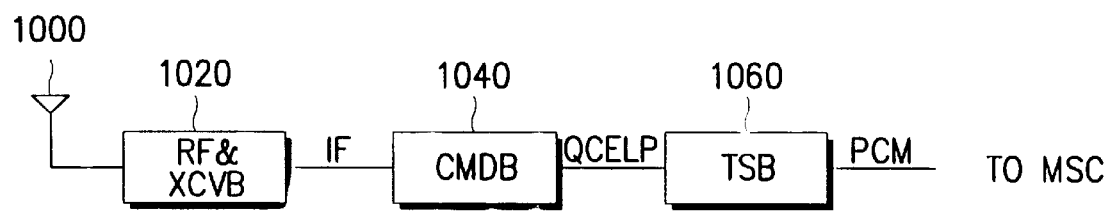
FIG. 15 is a block diagram of a BS for detecting a dropped call.

FIG. 15 is a block diagram of the BS for detecting a call drop. Referring to FIG. 15, a CDMA signal received through an antenna 1000 is converted to an IF (Intermediate Frequency) signal by an RF & XCVB (Radio Frequency & Transceiver Block) 1020. A CMDB (CDMA Modulation and Demodulation Block) 1040 converts the IF signal to a QCELP (Qualcomm Code Excited Linear Predictive coding) packet. During this operation, the CMDB 1040 determines whether a packet frame is normal or abnormal by checking its CRC (Cyclic Redundancy Code), and if abnormal it adds the abnormality indicating information (Quality Matrix: H'00-H'ff) to the converted packet. If the abnormality indicating information is zero, a TSB 1060 subjects the packet frame received from the CMDB 1040 to an abnormality operation. If it is one, the TSB 1060 converts the received packet frame to a PCM (Pulse Code Modulation) signal and sends the PCM signal to an MSC.

Upon a determination that the packet frame as bad, the TSB 1060 counts continuous errors and unreceived frames using a timer interrupt generated every 20 ms to make a final decision wether a call is dropped or not. That is, it is determined whether a frame is received at each 20 ms interrupt.

If 20 consecutive bad frames are received from the CMDB 1040, the TSB 1060 considers it to be predictive of a call drop. Then, if a predetermined number of consecutive bad frames are received for a first predetermined time, the TSB 1060 determines that the call is dropped. Assuming that the first predetermined time is 2 seconds, for example, the TSB 1060 declares a call drop if it receives 80 consecutive bad frames. However, if two consecutive normal frames are received, the non-reception counter is initialized and the TSB 1060 returns to a normal operation. On the other hand, if 20 consecutive frames are not received, the TSB 1060 considers it to be predictive of a call drop. Then, if no consecutive frames are received for a second predetermined time, the TSB 1060 determines that the call in progress is dropped. The second predetermined time is preferably shorter than the first predetermined time.

MS Detection of Call Drop

Now, an MS detection of a call drop will be described. An MS monitors a forward traffic channel on the traffic channel state. When the MS receives L consecutive bad frames on the forward traffic channel, it disables its transmitter. Then, if M consecutive good frames are received, the MS enables the transmitter. The MS activates a fade timer for the forward traffic channel when the transmitter is enabled, in a traffic channel initialization substate of the MS control on the traffic channel state. The fade timer is reset to N seconds when M consecutive good frames are received. When no consecutive good frames are received during the fade timer sequence, the MS disables the transmitter and declares a call drop.

Returning to FIG. 8, if the MS and/or the BS detects a call drop in steps 104 and 106, it holds the current call in step 112 while the radio links between the MS and the BS, between the BS and an MSC, and between the MSC and the PSTN (or another MSC) are still maintained. When necessary, the radio links between the MS and the BS and between the BS and the MSC can be released. In step 114, an information message notifying a wait for a reconnection is sent to the other subscriber or a service provider. The information message takes the form of voice message, music, tone, or mute for the other telephone subscriber. The message takes the form of null data for a data communication subscriber and a data service provider.

In step 116, a timer is set for a predetermined time Timer_Val2. When a reconnection waiting state is entered in step 118, the timer is activated in step 120. It is determined in step 122 whether there is a reconnection request or a location registration request is issued from the MS or the system (BS or MSC) before the timer expires. The timer value Timer_Val2 varies depending upon a system operating state and subscriber characteristics, ranging from several tens of seconds to several hundreds of seconds (e.g., 10–180 seconds) to determine the action time of call releasing. Timer_Val2 is preferably 30 to 60 seconds. When the dropped call reconnection function is uniformly registered for all MSs, the value Timer_Val2 is set as a predetermined value commonly applied to the MSes. On the other hand, if the function is provided individually for each MS, the value Timer_Val2 varies for each MS.

Upon request of a call reconnection or location registration within the value Timer_Val2 in step 122, the timer is deactivated in step 124. In step 126, the established call is released from the hold stated and reconnected on a traffic channel suitable for a new location of the MS. The information message is withdrawn in step 128. Thus, the MS can continue communication with the other subscriber or the service provider in the existing call service. However, if no reconnection request is issued within the value Timer_Val2, an information message notifying a call drop is sent to the other subscriber or the service provider in step 130, and the call is released in step 132.

Now, a description of a dropped call processing according to the four embodiments for drop call detection, previously described, will be given hereinbelow referring to FIG. 1 and FIGS. 8 to 12.

Prior to the description, it should be noted that in the same MSC/VLR area and in a different MSC/VLR area as shown in FIGS. 9 to 12 respectively, indicate that the MS is located in the same MSC/VLR area at the time when a call is dropped and a reconnection request and a location registration request are issued, and that the MS is located in a different MSC/VLR areas at the time when a call is dropped and a reconnection request and a location registration request are issued.

First Embodiment:

Call Drop Processing for a Drop Call Detected by an MS

Figure 9:
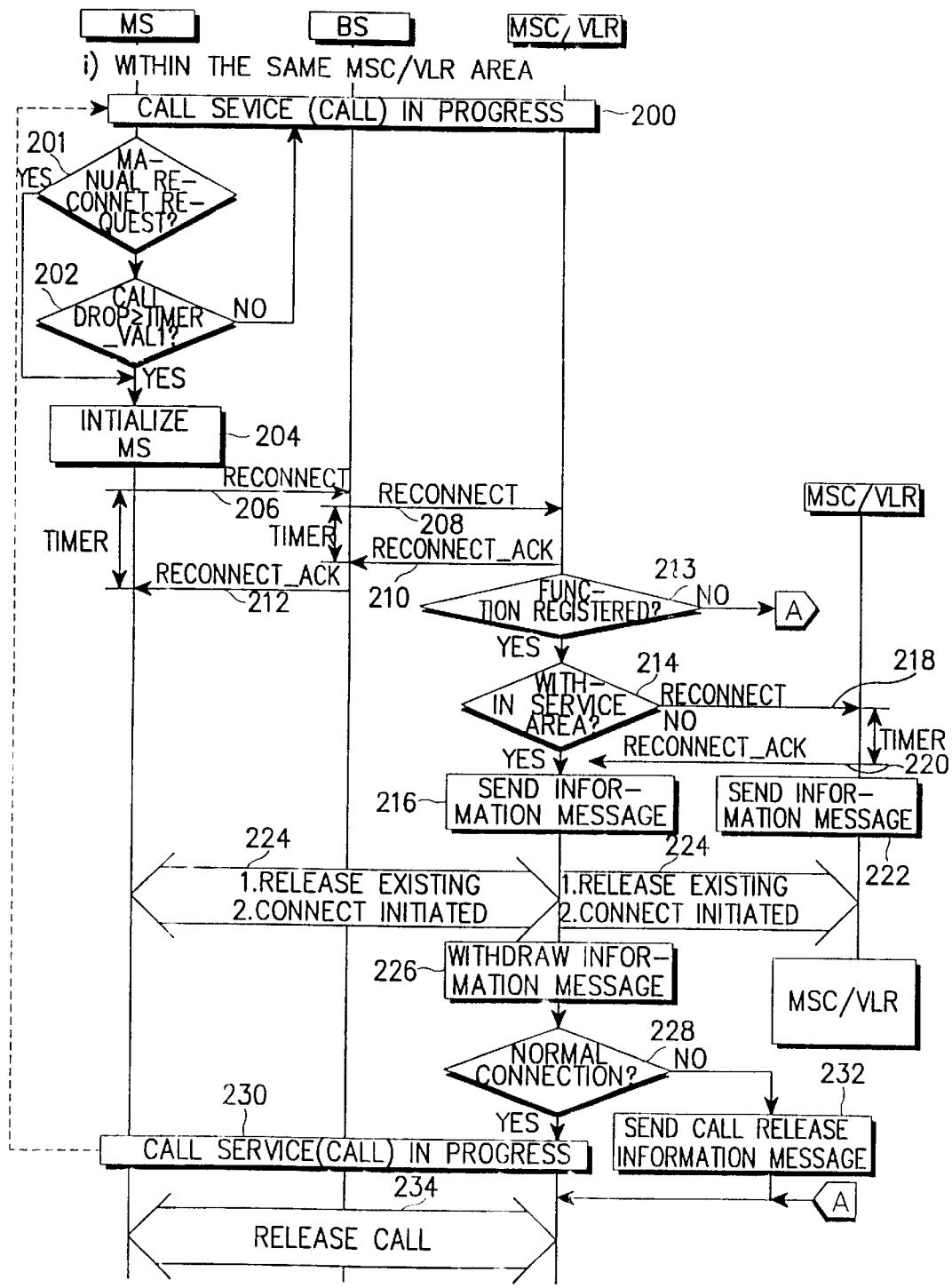
FIG. 9 is a flowchart illustrating a method of processing a dropped call upon detection of the call drop by an MS.

FIG. 9 is a flowchart of processing a dropped call when the MS detects the call drop. This situation occurs due to an abnormal traffic channel directed from the system to the MS.

Referring to FIGS. 1 and 9, when an MS subscriber presses a reconnection request key during a call in step 200, the MS perceives the reconnection request in step 201 and is initialized in step 204. If a call is dropped due to non-reception of frames during the call in step 200, it is determined whether the call drop state lasts as long as or longer than the predetermined time Timer_Val1 in step 202. If it does, the MS is initialized in step 204. Here, step 204 can be omitted.

Then, if the call drop is overcome, for example, due to a change in the location of the MS, the MS sends a reconnection request signal "Reconnect" having the parameter OLD_BS_ID shown in FIG. 3, to its serving BS in step 206. The serving, BS sends the signal "Reconnect" to a corresponding MSC in step 208. In step 210, the MSC sends a signal "Reconnect_Ack" back to the serving BS and in step 212, the BS sends the signal "Reconnect_Ack" back to the MS.

In step 213, the MSC determines whether the call reconnection function is uniformly registered for all MSs or as an additional service for an individual MS. If it is individually provided as an additional service, the MSC further determines whether the reconnection function is registered to be implemented for the MS requiring the call reconnection by analyzing the parameter DCAR_FLAG stored in its VLR. If the call reconnection function is not registered, a call release operation is performed in step 234. If the call reconnection function is registered, the MSC determines whether the parameter OLD_BS_ID of the received signal "Reconnect" indicates whether the MS is within the service area of the MSC, in step 214. If it does indicate the serving BS, the MSC sends an information message notifying a reconnection waiting to the other subscriber or the service provider, in step 216. For example, a call in progress is dropped when the MS 50 is within the coverage area of BTS000 62*a*, and the MS 50 moves into the area of BTS001 62*b* and requests a call reconnection. Then, MSC0 70*a* recognizes that the MS 50 is within its service area and sends the information message notifying "a reconnection waiting" to the other subscriber or the service provider.

If the MS is not within the service area of the MSC in step 214, the MSC sends the received signal "Reconnect" to a different MSC in step 218. The new MSC sends the signal "Reconnect_Ack" to the previous MSC in step 220, and sends the information message notifying "a reconnection waiting" to the other subscriber or the service provider. For example, a call in progress is dropped when the MS 50 is within the coverage area of BTS011 62*d*, and the MS 50 moves into the area of BTS100 62*e* and requests a call reconnection. Then, MSC0 70*a* sends MSC1 70*b* the signal "Reconnect" because the MS 50 is beyond its service area and the MSC1 70*b* sends the information message notifying a reconnection waiting to the other subscriber or the service provider.

After step 216 or 222, the MSC releases the existing links and connects an initiated call according to the current location of the MS in step 224. If the MS is within the service area of the same MSC, an origination call is set up, and the existing links are released and the initiated call is connected in the same manner as a hard handoff between BSes. For example, the MS 50 moves out of the coverage area of BTS000 62a into that of BTS001 62b and requests a reconnection, the existing links between the MS 50 and BTS000 62a and between BTS000 62a and BSC00 64a are released, and links are established between the MS 50 and BTS001 62b and between BTS001 62b and BSC00 64a. Then, those new links are connected to the other subscriber or the service provider. On the other hand, If the MS is within the service area of a different MSC, an origination call is set up, and the existing links are released and the initiated call is connected in the same manner as a hard handoff between MSCs. For example, the MS 50 moves out of the coverage area of BTS100 62e into that of BTS011 62d and requests a reconnection, the existing links between the MS 50 and BTS100 62e, between BTS100 62e and BSC10 64c, and between BSC10 64c and MSC1 70b are released, and links are established between the MS 50 and BTS011 62d, between BTS011 62d and BSC01 64b, between BSC01 64b and MSC0 70a, and between MSC0 70a and MSC1 70b. Then, those new links are connected to the other subscriber or the service provider.

In step 226, the MSC withdraws the information message notifying the waiting for reconnection, and in step 228, determines whether the initiated call is normally connected to the other subscriber or the service provider. If it is normally connected, the call proceeds in step 230. Otherwise, the MSC sends an information message notifying a call release to the other subscriber or the service provider in step 232 and performs a call release operation in step 234.

It is noted from FIG. 9 that the timer set for Time Val2 in steps 116 and 122 of FIG. 8 does not operate. This is because the MS issues a reconnection request shortly after its initialization in steps 204 and 206 and thus the BS need not determine whether a predetermined time passes after the reconnection request.

Second Embodiment:
Call Drop Processing According to Drop Call Detection by the System (i.e., BS or MSC)

Figure 10:
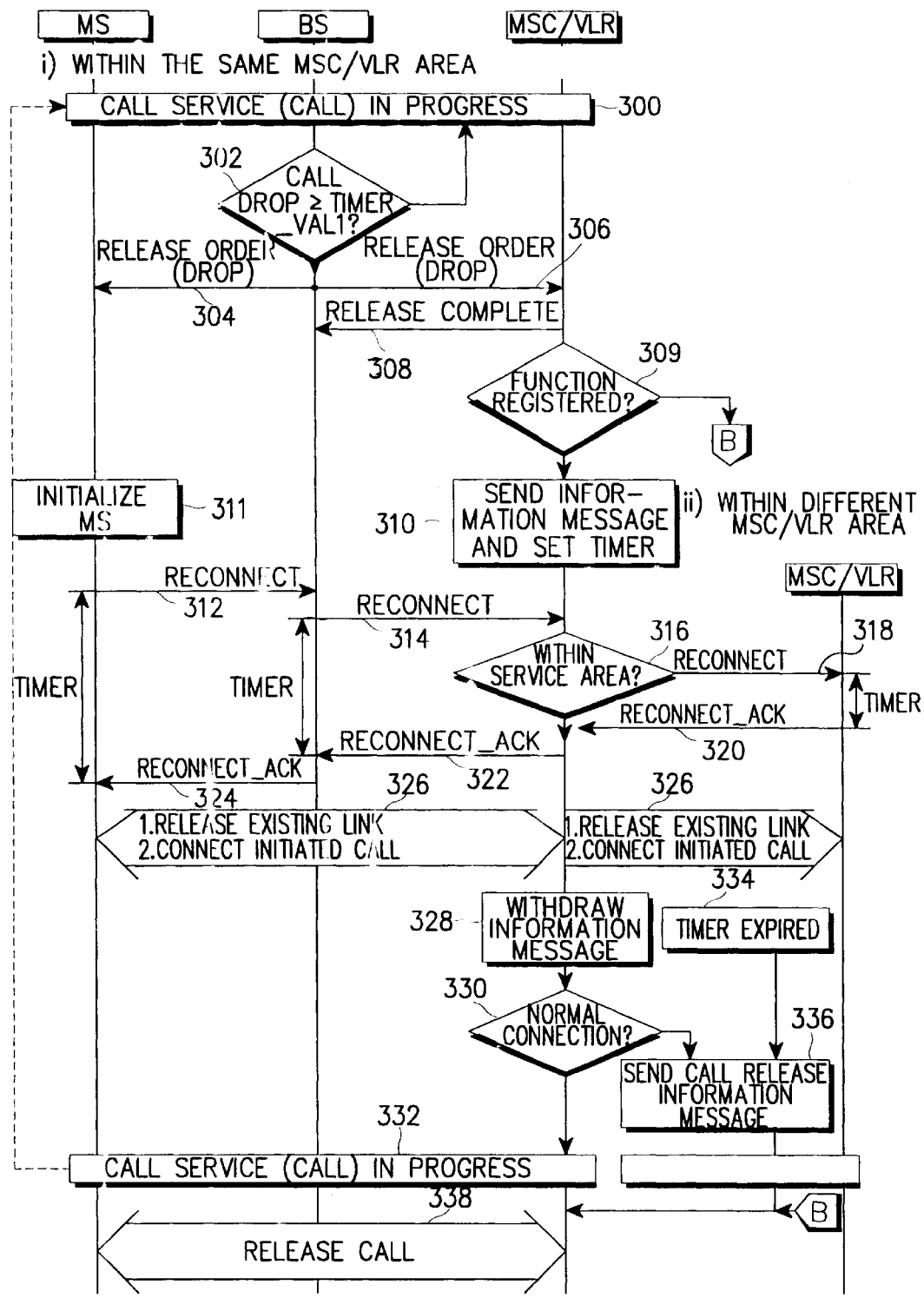
FIG. 10 is a flowchart illustrating a method for processing a dropped call upon detection of the call drop by a system.

FIG. 10 is a flowchart of processing a dropped call when the system detects the call drop. This case happens due to an abnormal traffic channel directed from the MS to the system.

Referring to FIGS. 1 and 10, if a call is dropped due to non-reception of frames during the call in step 300, the BS determines whether the call drop state lasts as long as or longer than the predetermined time Timer_Val1 in step 302. If it does, the BS sends a signal "Release Order" including the parameter RELEASE_STAT set to one (DROP=1) to the MS in step 304 and a signal "Release" including the parameter RELEASE_STAT set to one (DROP=1) to the MSC in step 306. Then, the MSC sends a signal "Release Complete" to the BS in step 308. In step. 309, the MSC determines whether the call reconnection function is uniformly registered for all MSs or as an additional service for an individual MS and whether the reconnection function, if it is individually provided as an additional service, is registered to be implemented for the MS by analyzing the parameter DCAR_FLAG stored in its VLR. If the call reconnection function is not registered regardless of indiscriminate provision or individual provision, a call release operation is performed in step 338. If the call reconnection function is registered, the MSC sends an information message notifying a reconnection waiting to the other subscriber or the service provider and activates a timer by setting the timer for Timer_Val2, in step 310.

In step 311, the MS, which received the signal "Release Order" having the parameter RELEASE_STAT set to one (DROP=1) from its serving MSC or a different MSC, is initialized. This step can be omitted. After step 311, if the call drop is overcome due to a variation in the location of the MS, the MS sends a signal "Reconnect" having the parameter OLD_BS_ID to the BS, in step 312. The BS sends the signal "Reconnect" to the MSC in step 314. The MSC determines in step 316 whether the parameter OLD_BS_ID represents the ID of a BS within its service area. If it does, the MSC sends a signal "Reconnect_Ack" to the BS in step 322, and the BS sends the signal "Reconnect_Ack" to the MS in step 324.

If the parameter does not represent a BS covered by the MSC in step 316, the MSC sends the received signal "Reconnect" to a corresponding MSC in step 318. The new MSC sends the signal "Reconnect_Ack" to the old MSC in step 320. Then, the old MSC sends the BS the signal "Reconnect_Ack" in step 322, and the BS sends the MS the signal "Reconnect_Ack" in step 324.

In step 326, the MSC releases the existing links and connects an initiated call. If the MS is within the service area of the same MSC, an origination call is set up, and the existing links are released and the initiated call is connected in the same manner as a hard handoff between BSes. On the other hand, If the MS is within the service area of a different MSC, an origination call is set up, and the existing links are released and the initiated call is connected in the same manner as a hard handoff between MSCs.

In step 328, the MSC withdraws the information message notifying a wait for reconnection, and in step 330, determines whether the initiated call is normally connected to the other subscriber or the service provider. If it is normally connected, the call proceeds in step 332. Otherwise, the MSC sends an information message notifying a call release to the other subscriber or the service provider in step 336 and performs a call release operation in step 338.

Meanwhile, if the timer set for Timer_Val2 (e.g., 30 to 60 seconds) has expired without receiving the reconnection request signal "Reconnect" from the MS in step 334, the MSC sends an information message notifying a call release to the other subscriber or the service provider in step 336 and performs a call release operation in step 338.

While the BS sends the signal "Reconnect Order" of DROP=1 to the MS in FIG. 10, the signal "Reconnect Order" can be replaced by a signal "Reconnect". In this case, steps 310, 312, and 324 can be omitted.

Third Embodiment:
Call Drop Processing According to Drop Call Detection By MS and System Due FIG. 11 is a flowchart of processing a dropped call caused by bidirectional abnormal traffic channels between the MS and the system.

Figure 11:
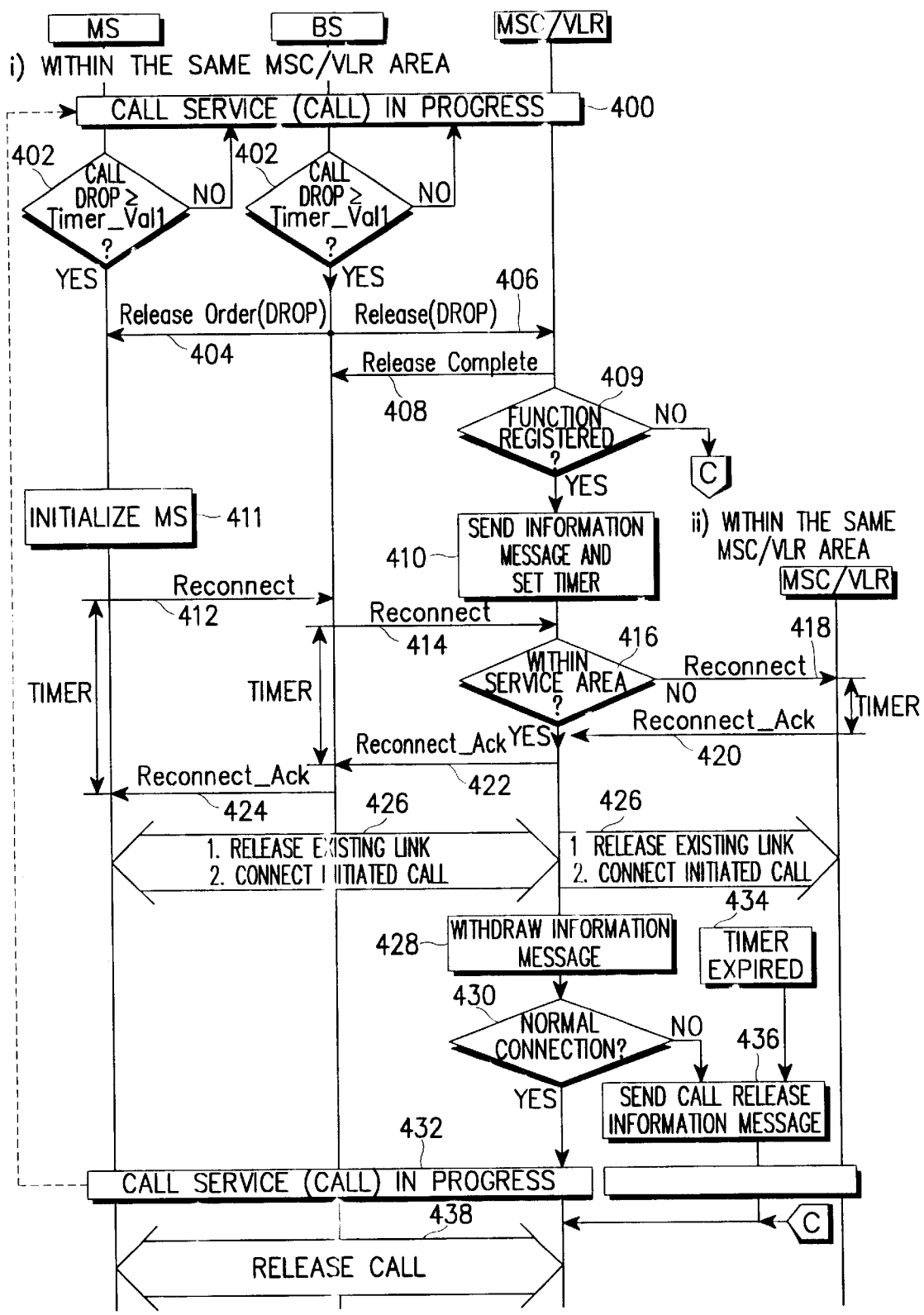
FIG. 11 is a flowchart illustrating a method for processing a dropped call upon detection of the call drop caused by bidirectional traffic channels by both the MS and the system.

Referring to FIGS. 1 and 11, if a call is dropped due to non-reception of frames during the call in step 400, the BS and the MS determine whether the call drop state lasts as long as or longer than the predetermined time Timer_Val1 in steps 401 and 402, respectively.

If it does, the BS sends a signal "Release Order" including the parameter RELEASE_STAT set to one (DROP=1) to the MS in step 404 and a signal "Release" including the parameter RELEASE_STAT set to one (DROP=1) to the MSC in step 406. Then, steps 406 and 438 are performed. A description of those steps will be omitted since they are the same as steps 306 to 338 of FIG. 10.

Figure 12:
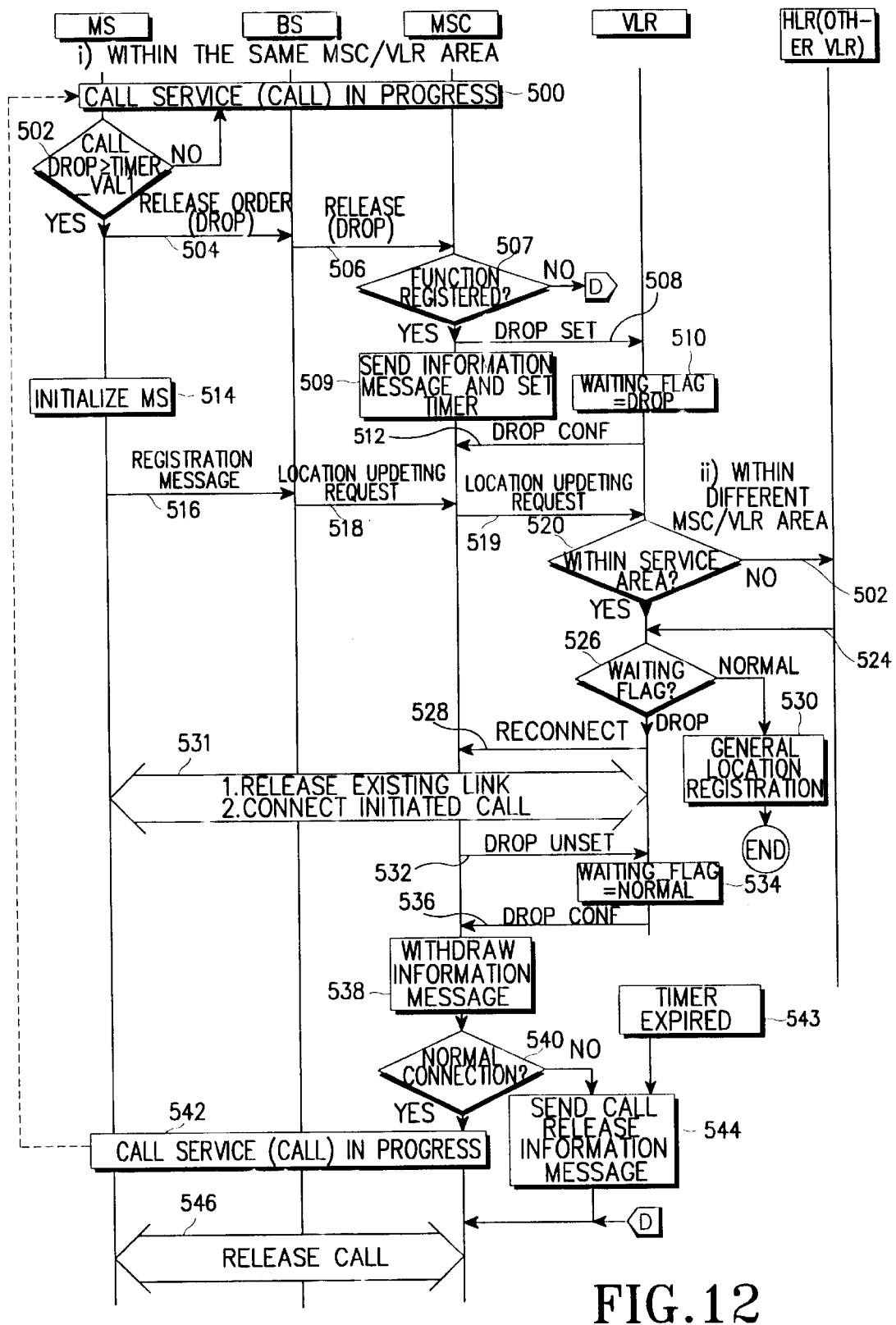
FIG. 12 is a flowchart illustrating a method for processing a dropped call in the case where the MS detects the call drop and issues a location registration request.

Fourth Embodiment:
Call Drop Processing According to a Location Registration Request FIG. 12 is a flowchart of processing a dropped call when the MS detects the call drop and request a location registration. This case happens an MS transits to a normal state without information on a call drop-caused location after a call drop, reserves information different from existing parameters, and requests a location registration to the system due to the call drop.

Referring to FIGS. 1 and 12, if a call is dropped due to non-reception of frames during the call in step 500, the MS determines whether the call drop state lasts as long as or longer than the predetermined time, in step 502. If the time duration exceeds Timer_Val1, the MS sends a signal "Release Order" including the parameter RELEASE_STAT set to one (DROP=1) to the BS in step 504 and the BS sends the signal Release including the parameter RELEASE_STAT set to one (DROP=1) to the MSC in step 506. In step 507, the MSC determines whether the call reconnection function is uniformly registered for all MSs or as an additional service for an individual MS and then whether the reconnection function, if it is individually provided as an additional service, is registered to be implemented for the MS by analysing the parameter DCAR_FLAG stored in its VLR. If the call reconnection function is not registered regardless of indiscriminate provision or individual provision, a call release operation is performed in step 546.

If the call reconnection function is registered, the MSC sends a signal "DROP SET" to its VLR in step 508, and the VLR sets the parameter WAITING_FLAG indicating a normal call release or a dropped call-caused call release to DRP=1 in step 510. Then, the VLR sends the MSC a signal DROP CONF representative of drop confirmation in step 512.

Meanwhile, the MSC sends an information message notifying a reconnection waiting to the other subscriber or the service provider and activates a timer by setting the timer for Timer_Val2, in step 509.

In step 514, the MS, which sent the signal "Release Order" having the parameter RELEASE_STAT set to one (DROP=1) to the BS, is initialized. This step can be omitted. After step 511, if the call drop is overcome due to a change in the location of the MS, the MS sends a location registration request signal "Registration Message" to the BS, in step 516. In response, the BS sends a signal "Location Updating Request" to the MSC in step 518 and the MSC sends the received signal to the VLR in step 519. Then, the VLR determines in step 520 whether the MS is within the service area of the VLR. If it is not, the VLR requests an HLR or another VLR to determine whether the call proceeds for the MS, in step 522, and receives a response message for the request in step 524. On the contrary, if the MS is within the service area of the VLR, the VLR checks the parameter WAITING_FLAG for the MS, in step 526. If the parameter is set to zero, the VLR performs a general location registration procedure in step 530. If the parameter is set to one, the VLR sends a signal "Reconnect" to the MSC in step 528.

In step 531, the MSC releases the existing links and connects an initiated call. If the MS is within the service area of the same MSC, an origination call is set up, and the existing links are released and the initiated call is connected in the same manner as a hard handoff between BSs. On the other hand, If the MS is within the service area of a different MSC, an origination call is set up, and the existing links are released and the initiated call is connected in the same manner as a hard handoff between MSCs.

In step 532, the MSC sends a signal DROP UNSET to the VLR and in step 534, the VLR changes the parameter WAITING_FLAG to zero. Then, the VLR sends a signal DROP CONF to the MSC in step 536. In step 538, the MSC withdraws the information message notifying the waiting for reconnection, and in step 540, determines whether the initiated call is normally connected to the other subscriber or the service provider. If it is normally connected, the call proceeds in step 542. Otherwise, the MSC sends an information message notifying a call release to the other subscriber or the service provider in step 544 and performs a call release operation in step 546.

Meanwhile, if the timer set for Timer_Val2 (e.g., 30 to 60 seconds) has expired without receiving the reconnection request signal "Reconnect" from the MS in step 543, the MSC sends an information message notifying a call release to the other subscriber or the service provider in step 544 and performs a call release operation in step 546.

Figure 13:
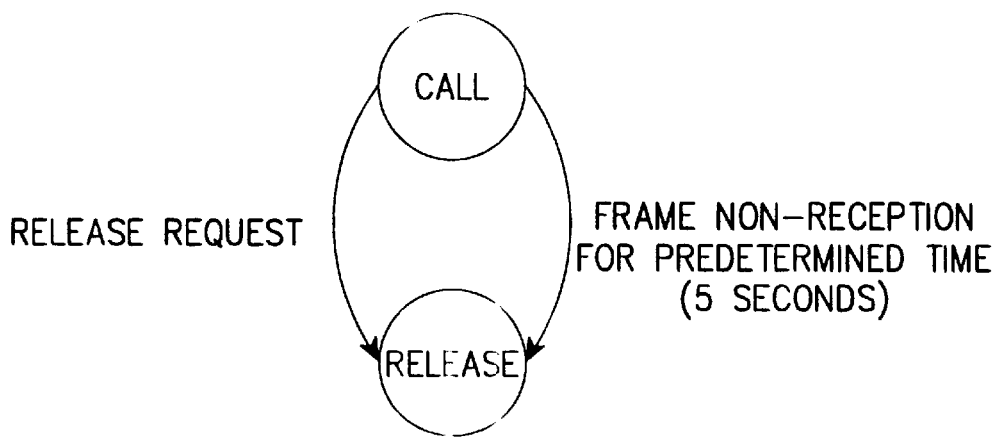
FIG. 13 is a diagram of conventional call processing states.
Figure 14:
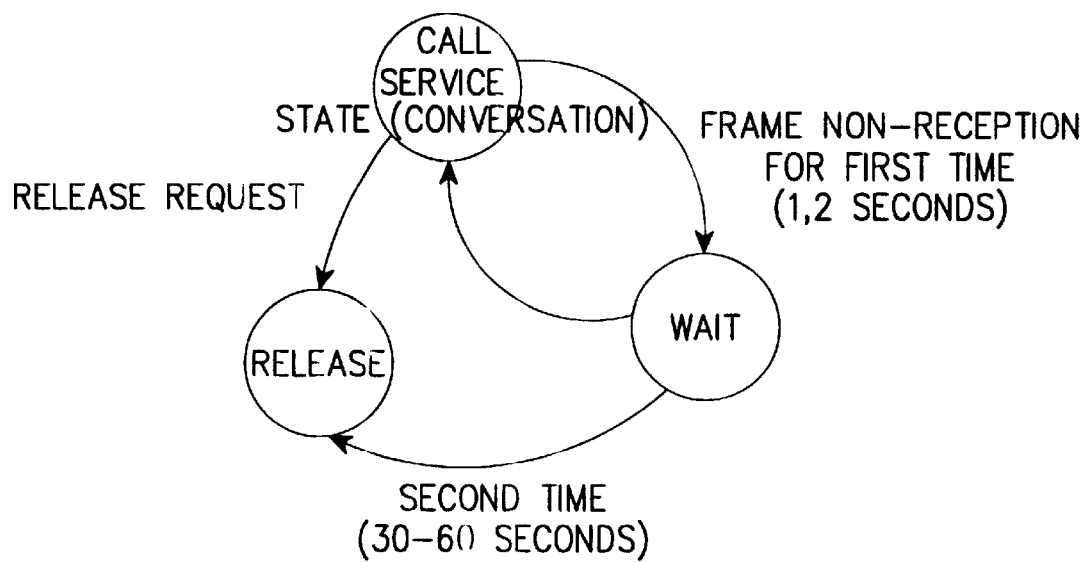
FIG. 14 is a diagram of call processing states according to the embodiments of the present invention.

FIGS. 13 and 14 illustrate call processing state transitions according to both conventional technology and in the present invention.

As shown in FIG. 13, upon a call release request or a call drop for a predetermined time, for example, 5 seconds, a call release state is entered in the prior art. In comparison to the prior art, as shown in FIG. 4, upon a call drop for a first time (e.g., 1.2 seconds) during a call service, an idle state is entered in the present invention. Then, if a reconnection request is issued, the idle state transitions to a conversation state. However, if the call drop occurs a second time (preferably, 30 to 60 seconds) in the idle state, a call release state is entered. If a call release is requested in the conversation or idle state, the call release state is immediately entered.

As described above, the present invention is advantageous in that the inconvenience of resuming a call temporarily dropped in an elevator or a tunnel overcome by providing an automatic dropped call reconnecting function in a PLMN. Therefore, subscribers are relieved of the concerns associated with call drops and call service quality can be increased.

While the present invention has been described in detail with reference to the specific embodiments, they are exemplary applications. Thus, it is to be clearly understood that many variations can be made by anyone skilled in and spirit of the art within the scope

What is claimed is:

1. A method of reconnecting a communication link terminated by a service impediment during a service between an mobile terminal and a second mobile terminal communicating with the mobile terminal through one of BSs connected to the mobile terminal and at least one of MSCs connected to the BS in a mobile communication system having the plurality of BSs and the plurality of MSCs, the method comprising the steps of:

sending service impediment information by the mobile terminal during the service impediment;

sending a location registration request message by the mobile terminal when a serviceable state is entered; and storing information by an MSC connected to the BS in a location register of the MSC indicating that the service for the mobile terminal is on hold, when the MSC receives the service impediment information through the BS.

2. The method of claim 1, further comprising the step of detecting the service impediment by the mobile terminal before sending the service impediment information.

3. The method of claim 2, wherein the service impediment is considered to be detected when the service impediment lasts for a predetermined first time period.

4. The method of claim 3, wherein the predetermined first time period is between zero and several seconds.

5. The method of claim 1, further comprising the steps of:
- determining by one of the plurality of MSCs connected to one of the plurality of BSs whether the service impediment information is stored in a location register of the MSC when the MSC receives the location registration request message;
- searching by the MSC for a new service channel between the MSC and the mobile terminal if the service impediment information is stored in the location register of the MSC; and
- reinitiating the service between said first and second mobile terminals by causing the MSC connecting the new service channel to a service channel between the MSC and the other terminal communicating with the mobile terminal.

6. The method of claim 5, further comprising the step of sending the second mobile terminal an information message by the MSC indicating that the MSC is waiting for a reconnection on the service channel between the MSC and the other terminal, prior to the storing step.

7. The method of claim 5, further comprising the step of sending the second mobile terminal an information message by the MSC indicating a call release on the service channel between the MSC and the other terminal, and releasing the service channel by the MSC, if the search for the new service channel is not completed within a predetermined second time period.

8. The method of claim 5, wherein the predetermined second time period is between several tens of seconds and several hundreds of seconds.

9. The method of claim 5, further comprising the step of:
- requesting a home location register by the MSC to determine the service status for the mobile terminal, and receiving a response for the request by the MSC from the home location register, if the information is not registered.

10. The method of claim 7, further comprising the step of sending the other subscriber an information message by the MSC indicating a call release on the maintained service channel and releasing the maintained service channel, if the search for the new service channel is not completed within a predetermined second time period.

* * * * *